United States Patent Office 2,830,029
Patented Apr. 8, 1958

2,830,029
PREPARATION OF CELLULAR PRODUCTS CONTAINING ORGANIC SULFONYL AZIDES AND COMPOSITION THEREOF

Frederic H. Adams, Bound Brook, N. J., assignor to American Cyanamid Company, New York, N. Y., a corporation of Maine No Drawing. Application April 28, 1955
Serial No. 504,655

12 Claims. (Cl. 260—2.5)

This invention relates to cellular organoplastics materials and the preparation thereof. More particularly, it relates to the preparation of cellular rubber and other thermosetting organoplastic materials. Still more particularly, it relates to the preparation of such cellular materials using a new class of blowing agents which comprise organic sulfonyl azides.

In the preparation of cellular rubber products, it is necessary that the material used as the blowing agent meet certain requirements. For instance, it must be capable of dispersing evenly in the rubber so as to produce small and uniform cells rather than coarse cells or large cavities when decomposing. Complete evolution of the gaseous decomposition product should occur prior to completion of vulcanization to produce a blown product of as low a density as possible. Further, the blowing agent must not interfere chemically with vulcanization accelerators or other materials used in the process of vulcanization. Moreover, the blowing agent itself should not accelerate the vulcanization process since incomplete blowing will accompany premature vulcanization.

While a blowing agent must be unstable at the vulcanization temperature, it should be stable in storage, transportation and handling. At the same time, however, the above instability should not be such as to cause decomposition explosively within the treating temperature range. Moreover, decomposition should not occur until partial vulcanization has occurred so that the rubber stock has sufficient strength to retain the gaseous decomposition product. On the other hand, vulcanization should not have proceeded to such an extent prior to decomposition that cell formation is restricted.

Still further, a blowing agent should be non-toxic and odorless as should its decomposition product. Moreover, both the blowing agent itself and its decomposition product should preferably be colorless, thereby permitting its use in the manufacture of all types of cellular products, including those which must be light in color and free of stain.

It has now been discovered that organic sulfonyl azides fulfill the various above described characteristics required of a blowing agent surprisingly well. Particularly, they are unusually effective in the treatment of rubber to produce blown products. The organic sulfonyl azides of this invention may be represented by the following formula:

$$R[SO_2N_3]_n$$

where $n$ may be 1 or 2 and R represents an aliphatic hydrocarbon radical, an aromatic hydrocarbon radical or a heterocyclic radical as further exemplified below.

It is an advantage of the blowing agents of this invention that they may be readily preapred by several methods. For instance, they may be prepared by reacting an organic sulfonyl chloride with an alkali azide. Alternatively, they may be formed by reacting an organic sulfonyl hydrazine with nitrous acid.

The following list of organic sulfonyl chlorides which may be employed in the method first described above is given as exemplary only and is not intended to be limiting. There may be employed for instance, such alkyl sulfonyl chlorides as methanesulfonyl chloride, β-ethoxyethanesulfonyl chloride, propanesulfonyl chloride, propane-α,β-disulfonyl chloride, butane-α-sulfonyl chloride and diethyl ether-β,β'-disulfonyl chloride; aralkyl sulfonyl chlorides such as benzylsulfonyl chloride; aryl sulfonyl chlorides such as benzenesulfonyl chloride and its o,m, and p-halogen derivatives, 1,2-dimethylbenzene-3-sulfonyl chloride, benzene-o,m- and p-disulfonyl chlorides, 4-nitrobenzene-1,3-disulfonyl chloride, 1,3-dimethylbenzene-2,4-disulfonyl chloride, o,m and p-toluenesulfonyl chloride, 4-chlorotoluene-3-sulfonyl chloride, 6-chlorotoluene-3-sulfonyl chloride, 4,6-dichlorotoluene-3-sulfonyl chloride, 2-nitrotoluene-3-sulfonyl chloride, 6-nitrotoluene-3-sulfonyl chloride, naphthalene-1 and -2-sulfonyl chlorides, 4-bromo-naphthalene-1-sulfonyl chloride, 5-fluoronaphthalene-1-sulfonyl chloride, naphthalene-1,3, naphthalene-1,4-, and naphthalene-1,5-disulfonyl chlorides, 2-chloronaphthalene-1,5-disulfonyl chloride, anthracene-1-sulfonyl chloride, phenanthrene 1,5-disulfonyl chloride and methylisopropylphenanthrenedisulfonyl chloride; heterocyclic sulfonyl chlorides such as pyridine-2-sulfonyl chloride, pyridine-4-sulfonyl chloride, and quinoline-2,8-disulfonyl chloride.

Similarly, the following list of sulfonyl hydrazides are exemplary only of those which may be employed to form the blowing agents of this invention by reaction thereof with nitrous oxide. Such sulfonyl hydrazines include, for instance, alkyl derivatives such as methane-, ethane-, and propanesulfonyl hydrazine; cycloalkyl derivatives such as cyclohexanedisulfonyl and cyclohexylsulfonyl hydrazide; aryl derivatives such as benzene sulfonyl hydrazide and its halogen derivatives, benzene-1,3-disulfonyl hydrazide, 4-nitrobenzene and 1,3-dimethylbenzenesulfonyl hydrazides, p-toluenesulfonyl and toluene 2,4-disulfonyl hydrazide and m-xylene-4,6 disulfonylhydrazide; aralkyl derivatives such as benzylsulfonyl hydrazides; and heterocyclic derivatives such as pyridine-3-sulfonyl hydrazide, quinoline-8-sulfonyl hydrazide and Ar-tetrahydronaphthalene sulfonyl hydrazide.

As previously stated, the blowing agents of this invention are particularly effective in forming cellular rubber products. They may be used with either natural rubber or with synthetic rubber-like polymers and copolymers of butadiene-1,3. When so used, the blowing agent may be conveniently added during compounding in which the various materials are added to the rubber in preparation for vulcanization. The amount of blowing agent employed with rubber will vary according to the particular kind of rubber being treated, the particular blowing agent, the degree of blow desired and the like. As little as 0.5% by weight on the rubber may be satisfactorily employed in many instances. In general, however, the amount of blowing agent will vary from about 0.5% to 4% on the rubber, preferably from about 1% to about 3%.

The blowing agents of this invention may also be satisfactorily employed in the preparation of foamed plastic materials of the type generally recognized as thermosetting resins. Among these may be mentioned urea-aldehyde resins, phenol-aldehyde resins, melamine aldehyde resins, and the like. In such usage, the amount of blowing agent will generally run from about 10 to about 30% depending upon the particular blowing agent, the material being treated, the degree of blow desired and the like.

The compounds of this invention are of no practical use in forming foamed plastic products from that group of materials generally recognized as thermoplastic resins. By thermoplastic resin is meant a polymeric product of at least one vinyl type monomer such as acrylonitrile, styrene, methylacrylate, acrylic acid, maleic anhydride and the like. Used in such thermoplastic resinous materials, the blowing agents of this invention degrade the resin and turn it black. In addition, substantially no blow whatsoever is obtained. It is the more surprising, therefore, that the compounds of this invention are so effective when used in preparing cellular rubber and other blown thermosetting resinous products.

The following examples will further describe this invention. These examples are intended as illustrative only and not by way of limitation. Unless otherwise noted, all parts are by weight.

EXAMPLE 1

*Ethanesulfonyl azide*

$$CH_3CH_2SO_2N_3$$

To a warm solution of 34.6 parts of ethanesulfonyl chloride in 284 parts of 3A ethyl alcohol is added a solution of 40 parts of sodium azide in 150 parts of water. The resultant solution is stirred until the reaction is complete. The product, ethane sulfonyl azide, is extracted with ether and recovered therefrom by evaporation. Nitrogen evolution starts at 128° C. and becomes vigorous at 135° C.

EXAMPLE 2

*p-Anisolesulfonyl azide*

To a warm solution of 55 parts of p-anisolesulfonyl chloride in 326 parts of 3A alcohol is added gradually 32.5 parts of sodium azide dissolved in 130 parts of water. The solution is stirred until the reaction is complete and then drowned in 15,000 parts of cold water. On stirring, a non-miscible liquid product is formed which is drawn off. It may be dried or taken up in ether and the ether evaporated to give p-anisolesulfonyl azide. The product decomposes at 135° C. and evolves nitrogen vigorously at 160°–170° C.

EXAMPLE 3

*Quinoline-8-sulfonyl azide*

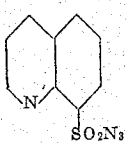

To a solution of 22.8 parts of quinoline-8-sulfonyl azide in 408 parts of warm 2B alcohol is added 14.6 parts of sodium azide in 40 parts of water. When the reaction is complete, about 500 parts of water are added to precipitate the product. The quinoline-8-sulfonyl azide product is isolated by filtration, washed with water and dried. Product decomposes at 121° C.

EXAMPLE 4

*Toluene-2,4-disulfonyl azide*

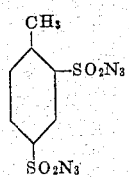

To 130 parts of 16.8% hydrochloric acid is added 28.8 parts of toluene-2,4-disulfonyl hydrazide and 630 parts of water. When a solution is obtained, it is cooled with an ice bath and then 40 parts by volume of 5 N sodium nitrite added. The colorless product, toluene-2,4-disulfonyl azide, precipitates and is isolated by filtration, washed with water and dried. M. P. 92–93° C.

EXAMPLE 5

*4,5-dimethyl-1,3-benzenedisulfonyl azide*

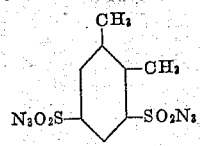

To 12 parts of o-xylene-3,5-disulfonyl chloride in 98 parts of denatured alcohol at room temperature is added 12 parts of sodium azide in a mixture of 60 parts of water and 60 parts of 2B alcohol. The mixture is stirred until reaction is complete and cooled externally in an ice bath until precipitation of the product, o-xylene-3,5-disulfonyl azide, is complete. The product is isolated by filtration and dried. M. P. 80° C.

EXAMPLE 6

Rubber stocks containing as blowing agents the compounds listed in Table I were compounded according to the following composition:

| Compound: | Parts |
|---|---|
| Plasticized rubber (20–25 Mooney ML–4 at 212° F.) | 100 |
| Stearic acid | 2 |
| Zinc oxide | 5 |
| Keystone Whiting | 50 |
| Light process aid | 10 |
| Petrolatum | 3 |
| 2,2' - methylene - bis -(4 - methyl - 6 - t - butylphenol) | 0.5 |
| Sulfur | 3 |
| Bis-benzothiazolyl disulfide | 0.6 |
| Di-o-tolyl guanidine | 0.15 |
| Blowing agent | 1.5 |

Samples of each stock were blown at 130° C. for 60 minutes and 153° C. for 35 minutes. The mold size was 6 cubic inches. High and low loads were blown at each temperature. The stock was white rubber and the portions for high and low loads were 51 grams and 42 grams, respectively.

The degree of blow is the measure of expansion of the original volume of rubber stock under the particular treatment conditions. It is indicated in Table I by the following:

C—the blown product completely fills the mold.

SRC—the blown product completely fills the mold except for slightly rounded corners.

RC—similar to "SRC" except the corners are more rounded.

I—incomplete blow to the extent that no portion of blown product touches the top of the mold.

TABLE I

| Blowing Agent | Degree of Blow | | | |
|---|---|---|---|---|
| | 130° C. | | 153° C. | |
| | 42 g. | 51 g. | 42 g. | 51 g. |
| m-benzenedisulfonyl azide | RC | SRC | RC | SRC |
| benzenesulfonyl azide | RC | C | RC | SRC |
| p-toluenesulfonyl azide | I | RC | RC | SRC |
| 2-naphthalenesulfonyl azide | I | SRC | RC | SRC |
| quinoline-8-sulfonyl azide | I | I | RC | RC |
| p-anisolesulfonyl azide | I | RC | RC | RC |
| benzylsulfonyl azide | RC | C | SRC | C |
| ethanesulfonyl azide | I | RC | RC | RC |
| 4,5-dimethyl-1,3-benzenedisulfonyl azide | SRC | SRC | RC | SRC |
| toluene 2,4-disulfonyl azide | SRC | SRC | RC | SRC |
| p-chlorobenzenesulfonyl azide | SRC | C | RC | C |
| naphthalene-1,5-bis-sulfonyl azide | SRC | SRC | SRC | SRC |

Table I indicates that the blowing agents of this invention, as illustrated by the exemplary compounds, vary in the degree of blow which they give under the various conditions of testing. Some of the compounds show an incomplete blow at the lower temperature and particularly the lower load but still show a good blow at the higher temperature at both loads. All the tested compounds are excellent in giving blown products of fine and uniform cell structure. Furthermore, all give substantially colorless products.

Copending application Serial No. 504,656 filed of even date by the applicant herein, now abandoned, is noted.

I claim:

1. A process of producing a cellular rubber selected from the group consisting of natural rubber and polymers of butadiene-1,3 which comprises incorporating in an unvulcanized, vulcanizable rubber composition an organic sulfonyl azide having the formula $$R[SO_2N_3]_n$$

in which $n$ is an integer less than 3, and R is selected from the group consisting of aliphatic hydrocarbon radicals, aromatic hydrocarbon radicals and heterocyclic radicals; and heating the resultant mixture at a temperature and for a time sufficient to decompose the azide and vulcanize the rubber, the organic sulfonyl azide being in amount sufficient to produce a cellular rubber.

2. A process according to claim 1 in which the organic sulfonyl azide is benzylsulfonyl azide.

3. A process according to claim 1 in which the organic sulfonyl is benzenesulfonyl azide.

4. A process according to claim 1 in which the organic sulfonyl azide is naphthalene-1,5-bis-sulfonyl azide.

5. A process according to claim 1 in which the organic sulfonyl azide is p-chlorobenzenesulfonyl azide.

6. A process according to claim 1 in which the organic sulfonyl azide is 4,5-dimethyl-1,3-benzenedisulfonyl azide.

7. An unvulcanized, vulcanizable rubber composition selected from the group consisting of natural rubber and polymers of butadiene-1,3 having incorporated therein an organic sulfonyl azide of the formula $$R[SO_2N_3]_n$$

in which $n$ is an integer less than 3, and R is selected from the group consisting of aliphatic hydrocarbon radicals, aromatic hydrocarbon radicals and heterocyclic radicals, the organic sulfonyl azide being in amount sufficient to produce a cellular rubber.

8. A composition according to claim 7 in which the organic sulfonyl azide is benylsulfonyl azide.

9. A composition according to claim 7 in which the organic sulfonyl azide is benzenesulfonyl azide.

10. A composition according to claim 7 in which the organic sulfonyl azide is naphthalene-1,5-bis-sulfonyl azide.

11. A composition according to claim 7 in which the organic sulfonyl azide is p-chlorobenzenesulfonyl azide.

12. A composition according to claim 7 in which the organic sulfonyl azide is 4,5-dimethyl-1,3-benzenedisulfonyl azide.

References Cited in the file of this patent

UNITED STATES PATENTS

| | | |
|---|---|---|
| 2,532,242 | Ott | Nov. 28, 1950 |
| 2,741,624 | Hunter | Apr. 10, 1956 |